(12) United States Patent
Cheng et al.

(10) Patent No.: US 9,172,270 B2
(45) Date of Patent: Oct. 27, 2015

(54) SMART AND SCALABLE LUNAR POWER INVERTERS

(71) Applicant: CyboEnergy, Inc., Rancho Cordova, CA (US)

(72) Inventors: George Shu-Xing Cheng, Folsom, CA (US); Steven L. Mulkey, Cameron Park, CA (US)

(73) Assignee: Cyboenergy, Inc., Rancho Cordova, CA (US)

( * ) Notice: Subject to any disclaimer, the term of this patent is extended or adjusted under 35 U.S.C. 154(b) by 348 days.

(21) Appl. No.: 13/846,708

(22) Filed: Mar. 18, 2013

(65) Prior Publication Data

US 2014/0265595 A1 Sep. 18, 2014

(51) Int. Cl.
*H02J 7/34* (2006.01)
*H02J 9/00* (2006.01)
*H02J 9/06* (2006.01)

(52) U.S. Cl.
CPC ... *H02J 9/00* (2013.01); *H02J 7/34* (2013.01); *H02J 9/062* (2013.01); *Y02B 10/72* (2013.01); *Y10T 307/50* (2015.04); *Y10T 307/625* (2015.04)

(58) Field of Classification Search
CPC ............... H02J 9/00; H02J 7/34; H02J 9/062; H02H 7/122; Y10T 307/50; Y10T 307/625; Y02B 10/72
USPC ........................................ 307/43, 66; 363/95
See application file for complete search history.

(56) References Cited

U.S. PATENT DOCUMENTS

| | | |
|---|---|---|
| 2009/0174259 A1 | 7/2009 | Lin et al. |
| 2010/0231045 A1 | 9/2010 | Collins et al. |
| 2011/0012430 A1 | 1/2011 | Cheng et al. |
| 2011/0148195 A1 | 6/2011 | Lee |
| 2012/0212065 A1 | 8/2012 | Cheng et al. |
| 2012/0313443 A1 | 12/2012 | Cheng et al. |
| 2013/0002031 A1 | 1/2013 | Mulkey et al. |
| 2014/0252862 A1 | 9/2014 | Cheng et al. |
| 2014/0265584 A1 | 9/2014 | Cheng et al. |

FOREIGN PATENT DOCUMENTS

JP 2001-008383 A 1/2001

OTHER PUBLICATIONS

PCT International Search Report dated Aug. 20, 2014 in related PCT Application No. PCT/US2014/030888.

*Primary Examiner* — Hal Kaplan
(74) *Attorney, Agent, or Firm* — Donald E. Stout; Stout, Uxa & Buyan, LLP

(57) ABSTRACT

A method and apparatus is disclosed for solar power generation when irradiance is low and unstable due to sunrise, sunset, clouding, partial shading, warped solar module surfaces, moving solar modules, and other low or varying irradiance conditions. A multi-channel solar power inverter connected to multiple solar modules can work in a "Lunar Power Mode", inverting DC power induced from the sky, street lights, or surrounding environment to AC power by using a unique rotating power pulling technology. This allows the inverter to dynamically adapt to irradiance variations and generate AC power under complex irradiance conditions. A UPS (uninterruptible power supply) works with a DC power supply to provide DC power to the internal electronic circuits of the inverter allowing it to run in normal power, low power, or lunar power modes.

19 Claims, 7 Drawing Sheets

SMART AND SCALABLE LUNAR POWER INVERTERS

INVENTION

The subject of this patent relates to direct current (DC) to alternating current (AC) power inverters that invert DC power from single or multiple DC power sources to single-phase or three-phase AC power, where the DC power sources include but are not limited to photovoltaic (PV) solar modules, PV cells, PV materials, PV thin films, fuel cells, batteries, and other DC power generators. More particularly, this patent relates to a method and apparatus that can maintain and maximize power production for solar power systems when irradiance is very low and unstable due to sunrise, sunset, clouding, partial shading, warped PV surfaces, moving solar modules, and other low or varying irradiance conditions. The technology could even allow a solar power inverter to invert the DC power from a number of solar modules and generate AC power when there is sufficient irradiance from the moon and surrounding lights at night. The novel approach can be especially useful when the efficiency of photovoltaic materials and modules is expected to improve significantly in the foreseeable future making AC solar power generation possible both day and night.

In the U.S. patent application Ser. No. 12/837,162, the entirety of which is hereby incorporated by reference, we described the novel Smart and Scalable Power Inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter.

In the U.S. patent application Ser. No. 13/397,402, the entirety of which is hereby incorporated by reference, we described the Scalable and Redundant Mini-Inverters that have double, triple, or quadruple redundant capabilities so that the Mini-Inverters can work in a harsh environment for a prolonged period of time. A number of regular, redundant, triple redundant, or quadruple redundant Mini-Inverters with one, two, three, or multiple input channels in a mixed variety can easily connect to one, two, three, or multiple DC power sources such as solar PV modules, invert the DC power to AC power, and daisy chain together to generate AC power to feed the power grid.

In the U.S. patent application Ser. No. 13/493,622, the entirety of which is hereby incorporated by reference, we described the Smart and Scalable Off-Grid Mini-Inverters that not only have the key scalable and redundant features as described in U.S. patent application Ser. Nos. 12/837,162 and 13/397,402, but can also supply power to electrical devices that are not connected to the power grid including motors, pumps, fans, lights, appliances, and homes.

In the U.S. patent application Ser. No. 13/537,206, the entirety of which is hereby incorporated by reference, we described an enclosure design to accommodate and support the unique features and capabilities of the Smart and Scalable Power Mini-Inverters that have multiple input channels, and a messaging system using LEDs (light-emitting diodes) mounted on the enclosure to indicate the system status of the Smart and Scalable Mini-Inverters.

In the U.S. patent application Ser. No. 13/789,637, the entirety of which is hereby incorporated by reference, we described a method and apparatus for maximizing power production for solar power systems when there is low sunlight during sunrise, sunset, clouding, partial shading, and other low irradiance conditions. A multiple-channel solar power Mini-Inverter can work in the low power mode when there is low sunlight, take power from one solar module to supply DC power to its internal electronic circuits, and also invert the DC power from the remaining connected solar modules to AC power feeding to the electric grid or powering AC loads.

In the U.S. patent application Ser. No. 13/844,484, the entirety of which is hereby incorporated by reference, we described a method and apparatus that can monitor the solar power inverters in real-time both day and night, and generate surveillance alarms and actions when a solar power inverter is removed or disconnected from the AC powerline for no good reason. It offers a low cost and reliable surveillance means to help guard a residential-scale, commercial-scale, or utility-scale solar power system in real-time at all times.

In this patent, a method and apparatus is disclosed for solar power generation when irradiance changes quickly or is very low due to sunrise, sunset, clouding, partial shading, warped PV surfaces, moving solar modules, and other low or varying irradiance conditions. A multi-channel solar power inverter connected to multiple solar modules can work in a "Lunar Power Mode", inverting DC power induced from the sky, street lights, or surrounding environment to AC power. In this case, the internal electronic circuits are powered by a UPS that has long life rechargeable batteries so that they do not use any power from the solar modules.

While in the lunar power mode when irradiance is low and inconsistent, the DC input power from each input channel of the solar power inverter most likely cannot supply sufficient power to allow continued AC power generation, where high quality AC sinewave output at 50 Hz or 60 Hz is desirable. To address this issue, a novel "rotating power pulling" technique has been developed so that the multi-channel inverter pulls power from only those channels that have sufficient power. The remaining channels thus can have time to charge the storage capacitors in their corresponding DC-DC boost converters.

Figure 1:
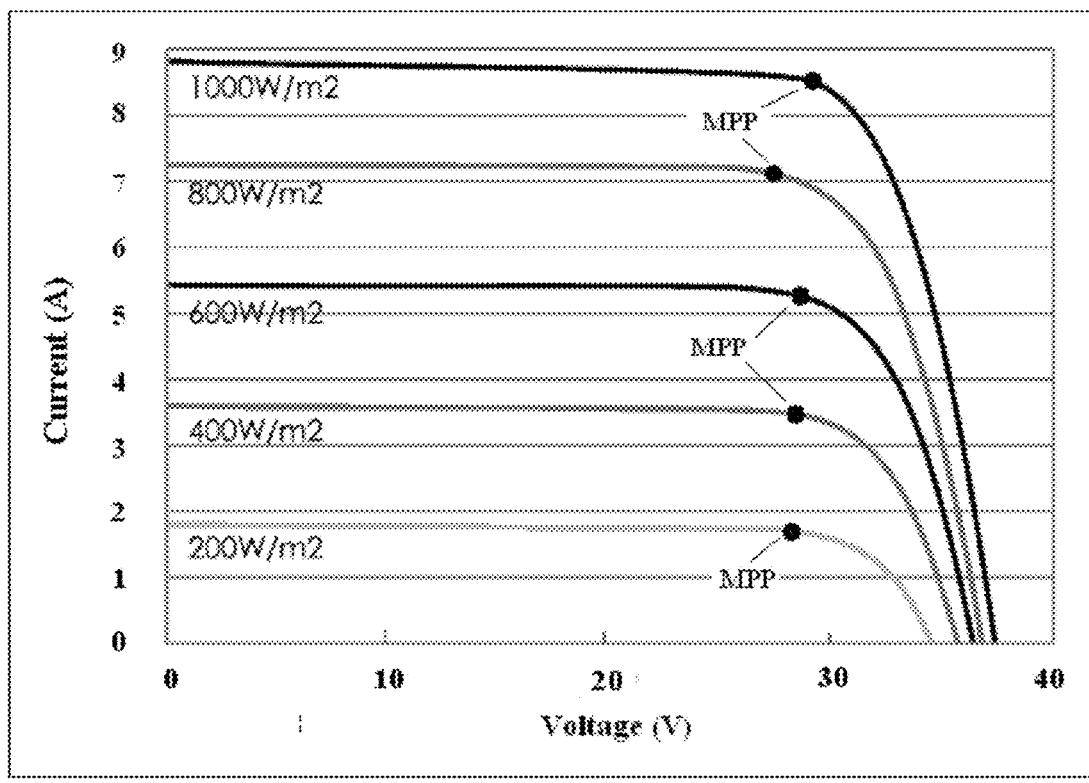
FIG. 1 shows the I-V curve of a typical solar module at different irradiances, where the current to voltage characteristics of the solar module is represented at different sunlight levels.

The term "mechanism" is used herein to represent hardware, software, or any combination thereof. The term "solar panel" or "solar module" refers to photovoltaic (PV) solar modules. The term "solar cell" refers to a piece of photovoltaic solar material or solar module. The term "AC load" is used herein to represent one or more single-phase or three-phase electrical devices including but not limited to motors, pumps, fans, lights, appliances, and homes. The term "UPS" is used herein to represent uninterruptible power supplies that have rechargeable batteries. The term "multi-channel inverter" refers to an inverter that has multiple input channels.

Throughout this document, m=1, 2, 3, . . . , as an integer, which is used to indicate the number of the DC input ports of an inverter. The term "input channel" refers to the DC input port of the inverter. Then, an m-channel inverter means that the inverter has m input channels or m DC input ports.

Throughout this document, if a solar power inverter is used to generate single-phase AC, it can also be applied to three-phase AC without departing from the spirit or scope of our invention. If a solar power inverter is used to generate three-phase AC, it can also be applied to single-phase AC without departing from the spirit or scope of our invention.

Without losing generality, all numerical values given in this patent are examples. Other values can be used without departing from the spirit or scope of our invention. The description of specific embodiments herein is for demonstration purposes and in no way limits the scope of this disclosure to exclude other not specially described embodiments of this invention.

DESCRIPTION

In a solar power system, photovoltaic (PV) solar modules and solar power inverters work together to collect solar energy and convert it into usable electricity. A solar power inverter inverts the DC power generated by solar modules to AC power feeding the electric grid or powering AC loads.

In the foreseeable future, the efficiency of photovoltaic materials and modules can be significantly higher. This means that a small and irregular shaped solar module can be capable of generating useful DC power. On the other hand, solar cells, modules, materials, and thin film can be incorporated in vehicles, buildings, roofs, tents, hats, clothing, shoes, and anything that one can imagine. This creates an interesting situation. Irradiance may go up and down quickly due to shading, warped PV surfaces, moving solar modules, etc. The DC output voltage and power from these solar modules can change quickly as well. Inverting the generated DC power to AC power from various moving solar modules that have different electrical characteristics and power levels can be extremely challenging.

When solar modules are connected in a series to form a solar module set that has one output, the performance of the set is dictated by the weakest solar module. This means, if solar modules are incorporated into clothing and if these modules are connected in a series with only one output, it will not generate much power because any one of the modules can be shaded bringing the total output power significantly down. A much better design is to allow each solar module to have an output to avoid the partial shading problem. Then, a multi-channel solar power inverter can be used to connect to each of the solar modules. The inverter can pull power from those solar modules that have sufficient power based on a novel rotating power pulling technique to be disclosed.

Most of today's solar power inverters are designed based on switching power supply techniques and include power electronic circuits, digital microcontroller circuits, communication circuits, etc. These circuits require DC power in order to work. For instance, a digital microcontroller typically needs 3.3V DC power. The switching power supply circuits include MOSFETs and MOSFET drivers, where the MOSFET drivers typically require 12V-15V DC to operate. Therefore, a solar power inverter typically consists of internal DC power supplies that can provide DC power at 3.3V, 5V, and 15V to its internal electronic circuits and components.

Where does the input power for these internal DC power supplies come from? A grid-interactive solar power inverter is connected to the AC powerline. As described in the U.S. patent application Ser. No. 12/837,162, a solar power inverter can be designed to include a DC power supply unit that can take the AC power from the grid, invert it to DC power, and supply the appropriate DC voltages to power the internal electronic circuits. This design includes the following shortcomings: (i) Inverting AC to DC power adds more complexity and cost; (ii) AC power is consumed even when the inverter is in the sleep mode; and (iii) It does not work for off-grid solar power inverters, where AC power is not available.

Another simpler design is to take the DC power from the solar module directly or indirectly. As described in the U.S. patent application Ser. Nos. 13/397,402 and 13/493,622, a grid-interactive solar power inverter or an off-grid solar power inverter can be designed to include an internal DC power supply to take power from the connected solar module (s) and provide proper DC power to its internal electronic circuits. This design, however, has a major limitation due to the DC power characteristics of the solar module.

FIG. 1 shows the I-V curve of a typical solar module at different irradiances, where the current to voltage characteristics of the solar module is represented at different sunlight levels. For instance, at 1000 W/m2, when the sunlight is quite strong, the solar module can supply about 260 W DC power at a condition of Voltage=30V and Current=8.7 A. (Power=Voltage×Current). This is a Maximum Power Point (MPP) marked on the chart. A well designed solar power inverter should have a good MPPT (Maximum Power Point Tracking) mechanism to search for the Maximum Power Point (MPP) under varying irradiance conditions. The inverter needs to be controlled to work at the Maximum Power Point under sunlight variations and partial shading conditions, while feeding power to the grid and meeting all AC synchronization and power quality requirements.

The challenge happens when even a small portion of the solar module is shaded by clouds or trees, or something has happened to cause a big drop in irradiance. For instance, irradiance suddenly drops from 1000 W/m2 to 200 W/m2 or less. When the inverter tries to pull power from the solar module, current is trying to increase which will cause the panel voltage to drop immediately from 30V to 15V or less. This phenomenon can be seen from the I-V curve. If the solar module cannot supply sufficient power, a small amount of current increase will cause voltage to decrease by a large amount. Since the internal DC power supply needs to supply power at 15V, its DC input power needs to be at least 18V.

When the solar module voltage drops below 18V, the internal power supply can no longer supply 15V DC to its internal electronic circuits. Then, the inverter is forced to shutdown or stop generating AC power.

All grid-interactive solar power inverters must meet UL-1741 and IEEE-1547 requirements to assure safety. Once disconnected from the power grid, a five-minute wait is mandatory before the inverter can attempt to restart or reconnect to the grid. This means, shutdowns of solar power inverters due to temporary partial shading or low sunlight condition can result in unnecessary power generation loss. In addition, during sunrise and sunset when the irradiance is low, most solar power inverters will have a difficult time generating AC power and providing adequate DC power to its internal electronics at the same time.

Figure 2:
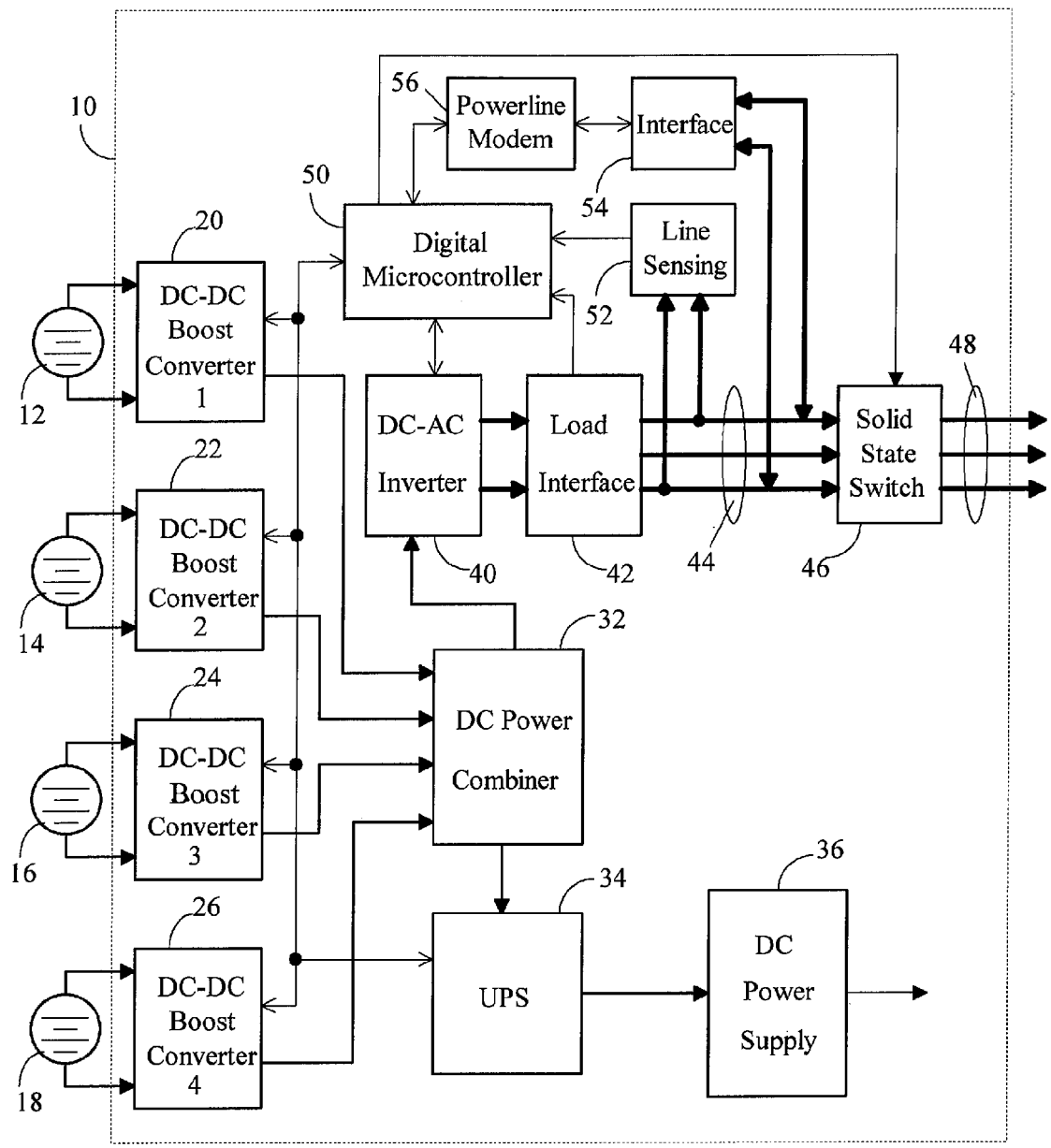
FIG. 2 is a block diagram illustrating a 4-channel solar power inverter that inverts the DC power from 4 solar modules to single-phase or three-phase AC power being sent to the power grid, where the internal electronic circuits of the inverter is powered by an internal UPS (uninterruptible power supply) according to an embodiment of this invention.

FIG. 2 is a block diagram illustrating a 4-channel solar power inverter that inverts the DC power from 4 solar modules to single-phase or three-phase AC power being sent to the power grid, where the internal electronic circuits of the inverter is powered by an internal UPS (uninterruptible power supply) according to an embodiment of this invention.

The 4-channel solar power inverter 10 is connected to 4 solar modules 12, 14, 16, 18 as DC sources. The inverter comprises 4 DC-DC boost converters 20, 22, 24, 26, a DC power combiner 32, a UPS 34, a DC power supply 36, a DC-AC inverter 40, a load interface circuit 42, an internal AC powerline 44, a solid-state switch circuit 46, an external AC powerline 48 that connects to the grid, a digital microcontroller 50, a line sensing circuit 52, an interface circuit for powerline communications 54, and a powerline communications Modem 56.

As mentioned earlier, the term "channel" or "input channel" refers to the DC input port of a multi-channel inverter. Without losing generality, an input channel may comprise a DC-DC boost converter, measurement circuits, supporting circuits, and cables and connectors to connect to a solar module. A 4-channel inverter means that the inverter has 4 input channels. An m-channel inverter means that the inverter has m input channels.

During normal operating conditions where there is sufficient sunlight, the power from solar modules 12, 14, 16, 18 is delivered to the corresponding DC-DC boost converters 20, 22, 24, 26, respectively. The DC power is then combined in the DC power combiner 32. The total combined DC power is then inverted by the DC-AC inverter 40 to AC power with a voltage higher than the incoming AC voltage. The generated AC power goes through the load interface circuit 42 to be combined with the AC power in the internal AC powerline 44. A solid-state switch 46 controlled by the digital microcontroller 50 is used to isolate the internal AC powerline 44 from the external AC powerline 48. A line sensing circuit 52 connected to the internal AC powerline 44 is used to detect the phase and zero-crossing point of the incoming AC power from the power grid. The phase and zero-crossing point signals are sent to the digital microcontroller 50 for AC power synchronization to assure that the power inverter provides high quality synchronized power to the grid. A powerline communications Modem 56, which is isolated by an interface circuit 54, is used to establish a 2-way digital signal communication between the digital microcontroller 50 and the outside world through the AC powerline. The internal DC power supply 36 takes DC power from one or more, preferably one, solar modules through its corresponding DC-DC boost converter, the DC power combiner 32, and UPS 34 to supply DC power to the internal electronics.

UPS typically refers to an uninterruptible power supply that provides emergency power to a load when the input power source fails. A UPS can provide near-instantaneous protection from input power interruptions by supplying power stored in rechargeable batteries. The UPS 34 as well as those to be described in other embodiments of this patent can be designed to include long life rechargeable batteries, battery charging circuits, a driving circuit with analog switching devices such as relays, FETs, and MOSFETs, etc. Since there are no power consuming parts such as cooling fans in the inverter, the UPS can be designed to include a battery to provide adequate DC power to the internal electronic circuits of the inverter.

During normal operating conditions when there is sufficient sunlight, all 4 channels of the inverter can run in the power generation mode and stay at the maximum power point (MPP) under irradiance variations. If there is sufficient irradiance, the inverter can generate full rated AC power to feed the grid. During sunrise, sunset, clouding, partial shading, or other low irradiance conditions, the inverter can detect the low irradiance situation based on the DC input power and enter a low power mode.

Going into the low power mode, the digital microcontroller 50 selects UPS 34 to provide stored DC power to the DC power supply 36. Based on this novel design, the 4-channel solar power inverter can avoid any unnecessary shutdowns caused by low irradiance situations. It can avoid the mandatory 5-minute wait since the inverter can stay connected to the power grid. If there is even a small amount of sunlight, each of the 4 channels can still generate power. Our tests show that each input channel can keep sending AC power to the grid at a condition where the solar module supplies only 1.5 W DC at voltage=14V and current=0.11 A. This is 0.6% power of a 250 W solar module. Most solar power inverters will be forced to shut down much sooner.

When irradiance gets even lower and becomes unstable, the inverter enters a lunar power mode. Here, lunar power does not mean the power has to come from the moon. It simply means that the irradiance is low and unstable. This condition can be detected by the measured DC input power from each channel based on a set of predetermined criteria. For instance, if the input power from all channels is below a predetermined value and is unstable, it can be a trigger to enter the lunar power mode. In the lunar power mode, the UPS can still provide adequate DC power to keep the inverter running. In addition, the inverter may still be able generate usable AC power based on a rotating power pulling technique to be described in the following.

Figure 3:
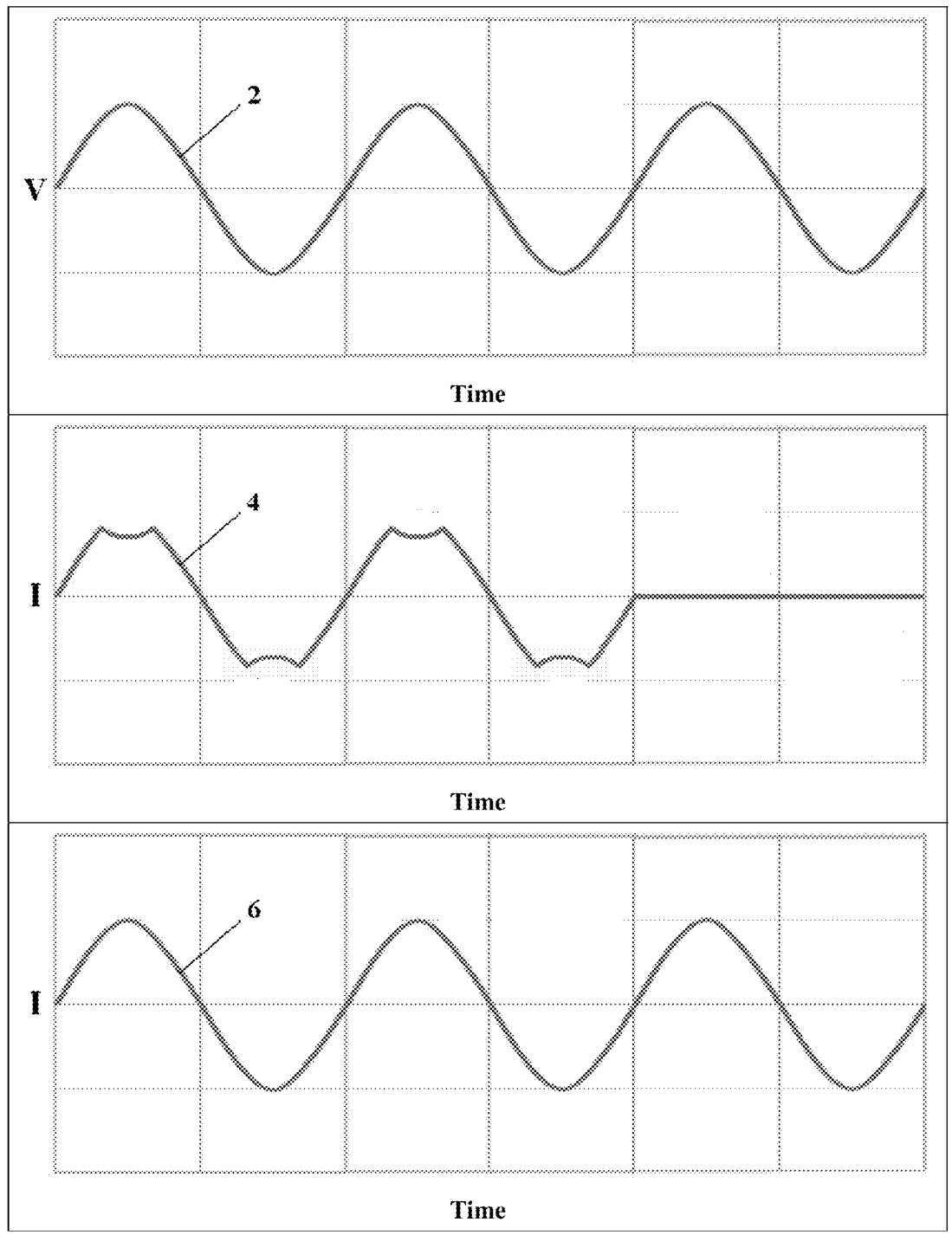
FIG. 3 is a drawing of an AC sinewave with multiple cycles illustrating the novel rotating power pulling technique, where the power for each half cycle is pulled from one or multiple channels of a multi-channel inverter depending on their available power according to an embodiment of this invention.

FIG. 3 is a drawing of an AC sinewave with multiple cycles illustrating the novel rotating power pulling technique, where the power for each half cycle is pulled from one or multiple channels of a multi-channel inverter depending on their available power according to an embodiment of this invention.

The DC-DC boost converters 20, 22, 24, 26 and those to be described in the other embodiments of this patent are designed to include a set of storage capacitors to store energy from the solar modules. In order to generate high quality 50 Hz or 60 Hz AC power that synchronizes with the AC waveform from the electric grid, it is necessary to pull power from the input channels based on the incoming AC sinewave. What happens if a channel does not have sufficient energy to be pulled from? Most likely, a large ripple or sagging waveform will occur, which creates un-desirable harmonic distortion to the output AC waveform. The UL 1741 Standard has stringent harmonic distortion limits that the grid-interactive solar power inverters must meet.

In FIG. 3, signal 2 on the top is the 240V AC voltage waveform from the electric grid. When the inverter synchronizes with this waveform, its output voltage waveform will be almost the same because the grid AC voltage is the leading AC signal that the inverter must follow, although the inverter output voltage needs to be a little higher than the incoming AC voltage in order to deliver power to the grid.

Signal 4 in the middle is the inverter output current which shows sagging waveform on the top. This is because the inverter pulls more energy than is available from the input channels causing the output current to sag. This is typically called an energy starving condition. The later part of the waveform shows that the inverter could no longer generate adequate AC current and had to stop.

Signal 6 on the bottom shows the inverter output current where the rotating power pulling mechanism is used. It shows much better waveform than signal 4 although the irradiance conditions are similar. In this case, the inverter will perform the following: (i) at the beginning of each sinewave half cycle, check the energy availability of each channel based on the charging voltage of storage capacitors in its corresponding DC-DC boost converter, (ii) pull power only from those channels that are sufficiently charged, and (iii) if the application demands more uniform AC power output, pull power conservatively so that the channels can have relatively more time to charge the storage capacitors when the irradiance is limited or unstable.

The rotating power pulling technique can be implemented in the power generation and control software running in the digital microcontroller 50 and those to be described in this document. We will present a software design example to be described in FIG. 7.

Figure 4:
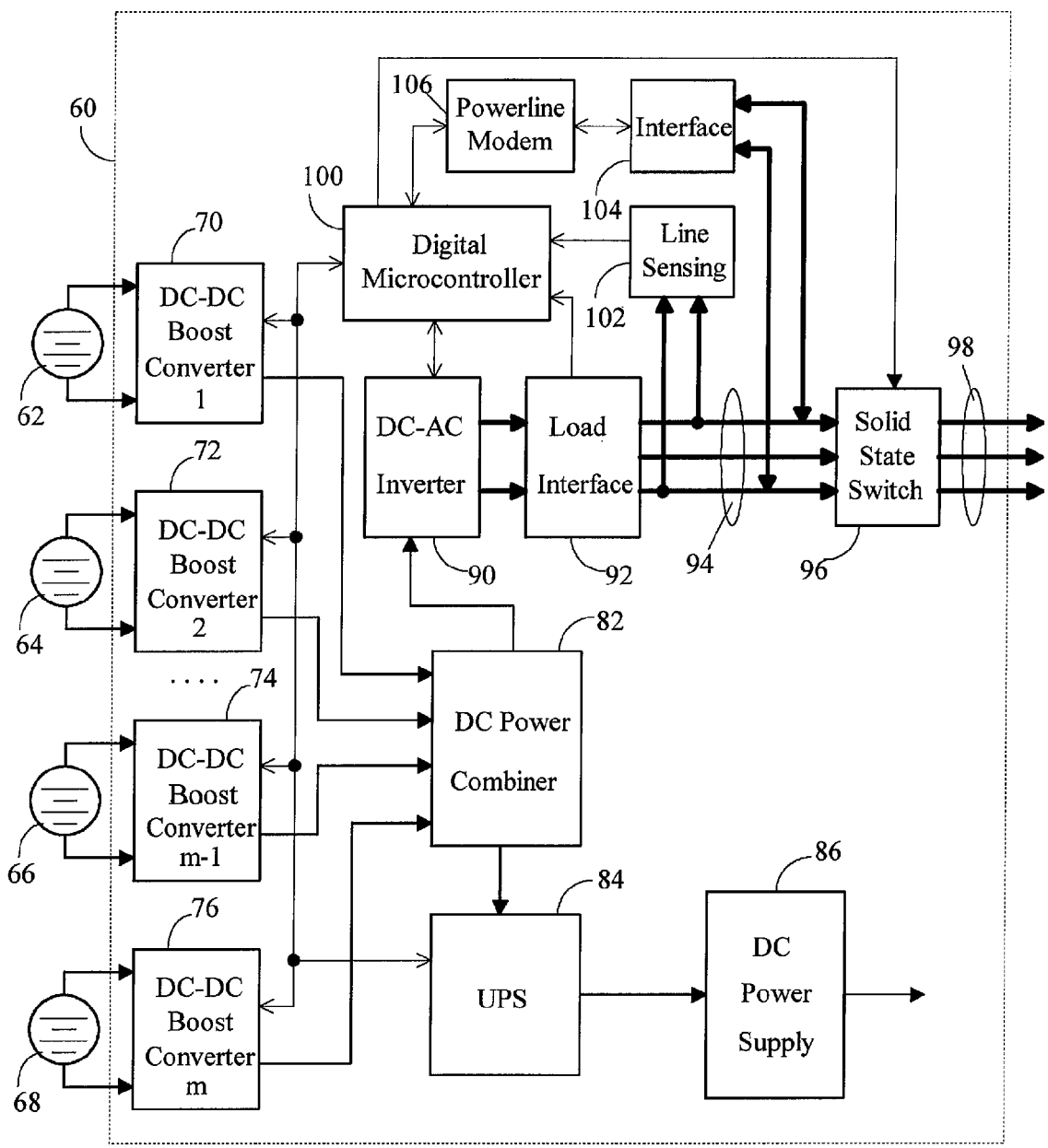
FIG. 4 is a block diagram illustrating a m-channel solar power inverter that inverts the DC power from m solar modules to single-phase or three-phase AC power being sent to the power grid, where the internal electronic circuits of the inverter is powered by an internal UPS according to an embodiment of this invention.

The digital microcontroller 50 in FIG. 2 and the one to be described in FIG. 4 is used to perform a number of tasks including (i) monitoring the DC boost voltage from each DC-DC boost converter, (ii) controlling the DC-DC boost converters, (iii) measuring input voltage and current, and calculating DC input power for each channel, (iv) performing maximum power point tracking (MPPT) for each solar module, (v) performing DC-AC inversion, AC power synchronization, and AC output current control, (vi) monitoring AC current and voltage for generated power amount and status, (vii) performing powerline communications, (viii) performing logic controls such as AC powerline switching and isolation, (ix) switching to UPS to supply DC power when the inverter is in the low power mode and lunar power mode, and/or (x) performing rotating power pulling when the inverter is in the lunar power mode.

FIG. 4 is a block diagram illustrating a m-channel solar power inverter that inverts the DC power from m solar modules to single-phase or three-phase AC power being sent to the power grid, where the internal electronic circuits of the inverter is powered by an internal UPS according to an embodiment of this invention.

The m-channel solar power inverter 60 is connected to m solar modules 62, 64, 66, 68 as DC sources. The inverter comprises m DC-DC boost converters 70, 72, 74, 76, a DC power combiner 82, a UPS 84, a DC power supply 86, a DC-AC inverter 90, a load interface circuit 92, an internal AC powerline 94, a solid-state switch circuit 96, an external AC powerline 98 that connects to the grid, a digital microcontroller 100, a line sensing circuit 102, an interface circuit for powerline communications 104, and a powerline communications Modem 106.

During normal operating conditions where there is sufficient sunlight, the power from solar modules 62, 64, 66, 68 is delivered to the corresponding DC-DC boost converters 70, 72, 74, 76, respectively. The DC power is then combined in the DC power combiner 82. The total combined DC power is then inverted by the DC-AC inverter 90 to AC power with a voltage higher than the incoming AC voltage. The generated AC power goes through the load interface circuit 92 to be combined with the AC power in the internal AC powerline 94. A solid-state switch 96 controlled by the digital microcontroller 100 is used to isolate the internal AC powerline 94 from the external AC powerline 98. A line sensing circuit 102 connected to the internal AC powerline 94 is used to detect the phase and zero-crossing point of the incoming AC power from the power grid. The phase and zero-crossing point signals are sent to the digital microcontroller 100 for AC power synchronization to assure that the inverter provides high quality synchronized power to the grid. A powerline communications Modem 106, which is isolated by an interface circuit 104, is used to establish a 2-way digital signal communication between the digital microcontroller 100 and the outside world through the AC powerline. The internal DC power supply 86 takes DC power from one or more, preferably one, solar modules through its corresponding DC-DC boost converter, the DC power combiner 82, and UPS 84 to supply DC power to the internal electronics.

During normal operating conditions when there is sufficient sunlight, all m channels of the inverter can run in the power generation mode and stay at the maximum power point (MPP) under irradiance variations. If there is sufficient irradiance, the inverter can generate full rated AC power to feed the grid. During sunrise, sunset, clouding, partial shading, or other low irradiance conditions, the inverter can detect the low irradiance situation based on the DC input power and enter the low power mode.

Going into the low power mode, the digital microcontroller 100 selects UPS 84 to provide stored DC power to the DC power supply 86. Based on this novel design, the m-channel solar power inverter can avoid any unnecessary shutdowns caused by low irradiance situations.

When irradiance gets even lower and becomes unstable, the inverter enters the lunar power mode. The UPS can still provide adequate DC power to keep the inverter running and the inverter may still be able generate usable AC power based on the rotating power pulling technique.

Figure 5:
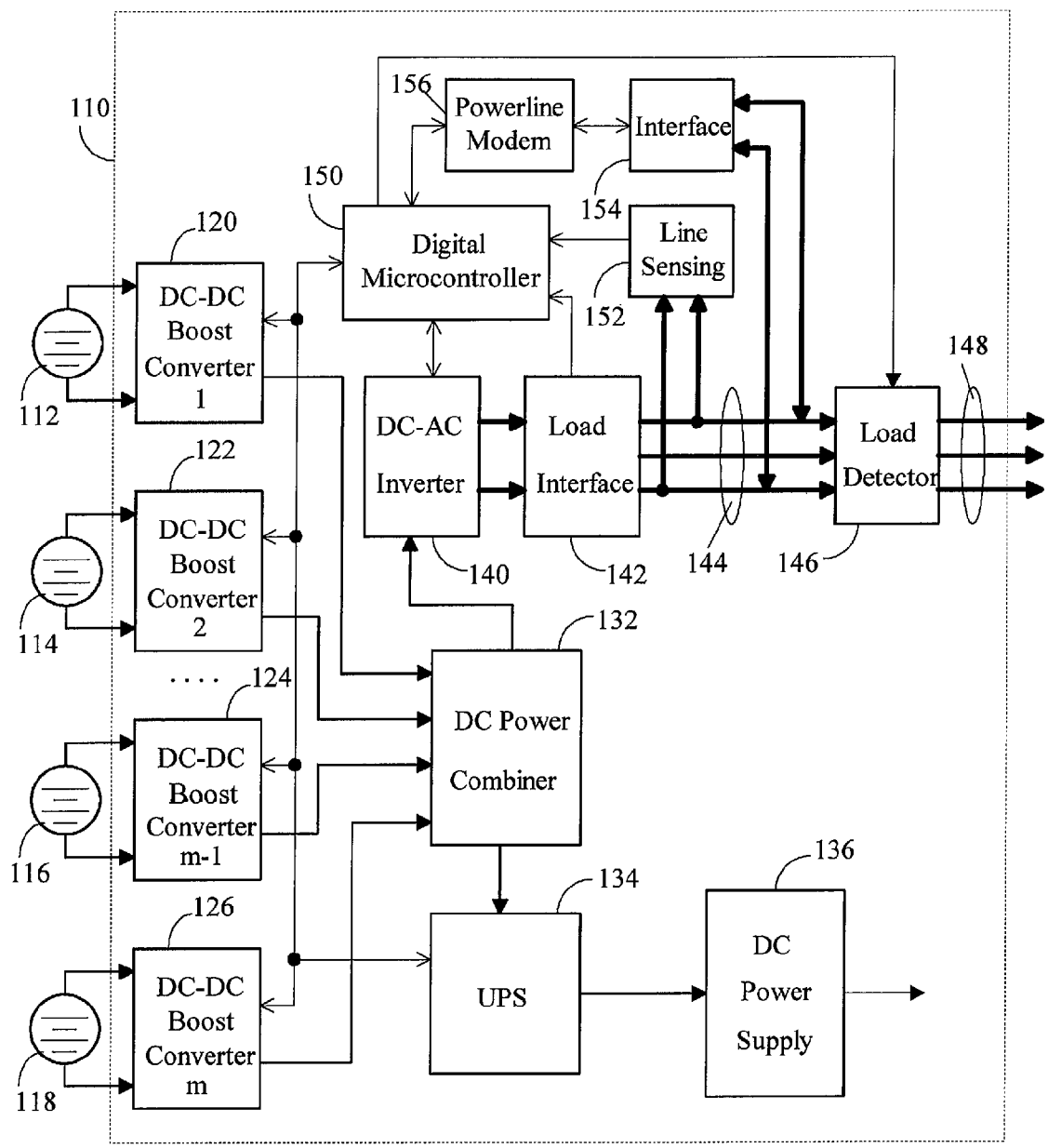
FIG. 5 is a block diagram illustrating a m-channel off-grid solar power inverter that inverts the DC power from m solar modules to single-phase or three-phase AC power to power an AC load, where the internal electronic circuits of the inverter is powered by an internal UPS according to an embodiment of this invention.

FIG. 5 is a block diagram illustrating a m-channel off-grid solar power inverter that inverts the DC power from m solar modules to single-phase or three-phase AC power to power an AC load, where the internal electronic circuits of the inverter is powered by an internal UPS according to an embodiment of this invention.

The m-channel off-grid inverter 110 is connected to m solar modules 112, 114, 116, 118 as DC sources. The inverter comprises m DC-DC boost converters 120, 122, 124, 126, a DC power combiner 132, a UPS 134, a DC power supply 136, a DC-AC inverter 140, a load interface circuit 142, an internal AC powerline 144, a load detector 146, an external AC powerline 148 which connects to an AC load, a digital microcontroller 150, a line sensing circuit 152, an interface circuit for powerline communications 154, and a powerline communications Modem 156.

During normal operating conditions where there is sufficient sunlight, the power from solar modules 112, 114, 116, 118 is delivered to the corresponding DC-DC boost converters 120, 122, 124, 126, respectively. The DC power is then combined in the DC power combiner 132. The total combined DC power is inverted to AC power within a user specified voltage range such as 120 VAC+/−10% or 240 VAC+/−10% by the DC-AC inverter 140. The generated AC power is sent to the AC load through the load interface circuit 142, internal AC powerline 144, load detector 146, and external AC powerline 148. A line sensing circuit 152 connected to the AC powerline 144 is used to detect if there is AC power on the powerline prior to the startup of the off-grid inverter. The line sensing circuit 152 is also used for monitoring the load on the AC powerline for over voltage, under voltage, over current, or under current conditions so that the total AC output voltage can be regulated to protect the inverter and the AC load.

The load detector 146 is an electronic circuit that can detect the impedance of the connected AC load. If no AC power is detected on the powerline, the load detector 146 checks the impedance of the AC powerline to determine if the connected AC load is within certain specifications.

The m-channel off-grid solar power inverter described in this embodiment can be designed as an AC Master off-grid inverter or a regular off-grid inverter as disclosed in the U.S. patent application Ser. No. 13/493,622. For a regular off-grid inverter, the load detector 146 is replaced by a solid-state switch circuit 96 as described in FIG. 4.

A powerline communications Modem 156, which is isolated by an interface circuit 154, is used to establish a 2-way digital signal communication between the digital microcontroller 150 and the outside world through the AC powerline. The internal DC power supply 136 takes DC power from one or more, preferably one, solar modules through its corresponding DC-DC boost converter, the DC power combiner 132, and UPS 134 to supply DC power to the internal electronics.

If the inverter 110 is an AC Master Off-Grid inverter, the digital microcontroller 150 performs the tasks including (i) monitoring the DC boost voltage from each DC-DC boost converter, (ii) controlling the DC-DC boost converters, (iii) measuring input voltage and current, and calculating DC input power for each channel, (iv) performing maximum power point tracking (MPPT) for each DC source, (v) performing DC-AC inversion, (vi) monitoring AC current and voltage for generated power amount and status, (vii) performing powerline communications, (viii) checking the impedance of the AC powerline to determine if the connected AC load is within certain specifications, (ix) initially energizing the AC powerline that has no power running to it, (x) continually delivering AC power to the AC powerline to allow the other off-grid inverters also connected on the same powerline to synchronize the AC power being produced, (xi) continually checking and determining whether the AC load is too large or too small for the power generation system to handle, (xii) turning the power off and triggering an error signal if the load is too large or too small, (xiii) switching to UPS to supply DC power when the inverter is in the low power mode and lunar power mode, and/or (xiv) performing rotating power pulling when the inverter is in the lunar power mode.

If the inverter 110 is a regular off-grid inverter, the digital microcontroller 150 is used to perform a number of tasks including (i) monitoring the DC boost voltage from each DC-DC boost converter, (ii) controlling the DC-DC boost converters, (iii) measuring input voltage and current, and calculating DC input power for each channel, (iv) performing maximum power point tracking (MPPT) for each solar module, (v) performing DC-AC inversion, AC power synchronization, and AC output current control, (vi) monitoring AC current and voltage for generated power amount and status, (vii) performing powerline communications, (viii) performing logic controls such as AC powerline switching and isolation, (ix) switching to UPS to supply DC power when the inverter is in the low power mode and lunar power mode, and/or (x) performing rotating power pulling when the inverter is in the lunar power mode.

During normal operating conditions where there is sufficient sunlight, all m channels of the inverter can run in the power generation mode and provide sufficient power to the AC load. During sunrise, sunset, clouding, or partial shading conditions, the inverter can detect the low sunlight situation based on the DC input power. Then, it will go into the low power mode.

Going into the low power mode, the digital microcontroller 150 selects UPS 134 to provide stored DC power to the DC power supply 136. Based on this novel design, the m-channel solar power inverter can avoid any unnecessary shutdowns caused by low irradiance situations. For an off-grid solar power inverter, AC power production is also dependent on the AC load. That means, if the produced AC power in the low power mode cannot meet the power requirements of the AC load, the off-grid solar power inverter will stop producing power. On the other hand, if the produced AC power meets the AC load requirements, the off-grid inverter can still supply power to the AC load even under low sunlight conditions. This feature can be useful for off-grid solar power applications where the AC loads are more flexible with required power such as lights.

When irradiance gets even lower and becomes unstable, the inverter enters the lunar power mode. The UPS 134 can still provide adequate DC power to keep the inverter running. For an off-grid application, a multi-channel solar power inverter that is enabled with the rotating power pulling technique can be quite powerful.

Assuming the solar power inverter in FIG. 5 is a 50-channel AC Master off-grid solar power inverter. In this case, the AC Master off-grid inverter can be considered a standalone inverter, which does not connect to other inverters. In this special application, 50 irregular-shaped, highly efficient thin-film solar modules are attached to the surface of a soldier's clothing. When the soldier is moving at night where there is low and varying irradiance from the sky and surrounding environment, the 50 solar modules on his clothing could produce 0 to a small yet usable amount of DC power. The 50-channel solar power inverter can actually invert the DC power from the solar modules by using the rotating power pulling technique to generate usable AC power to drive an AC load that can be important to the soldier.

Figure 6:
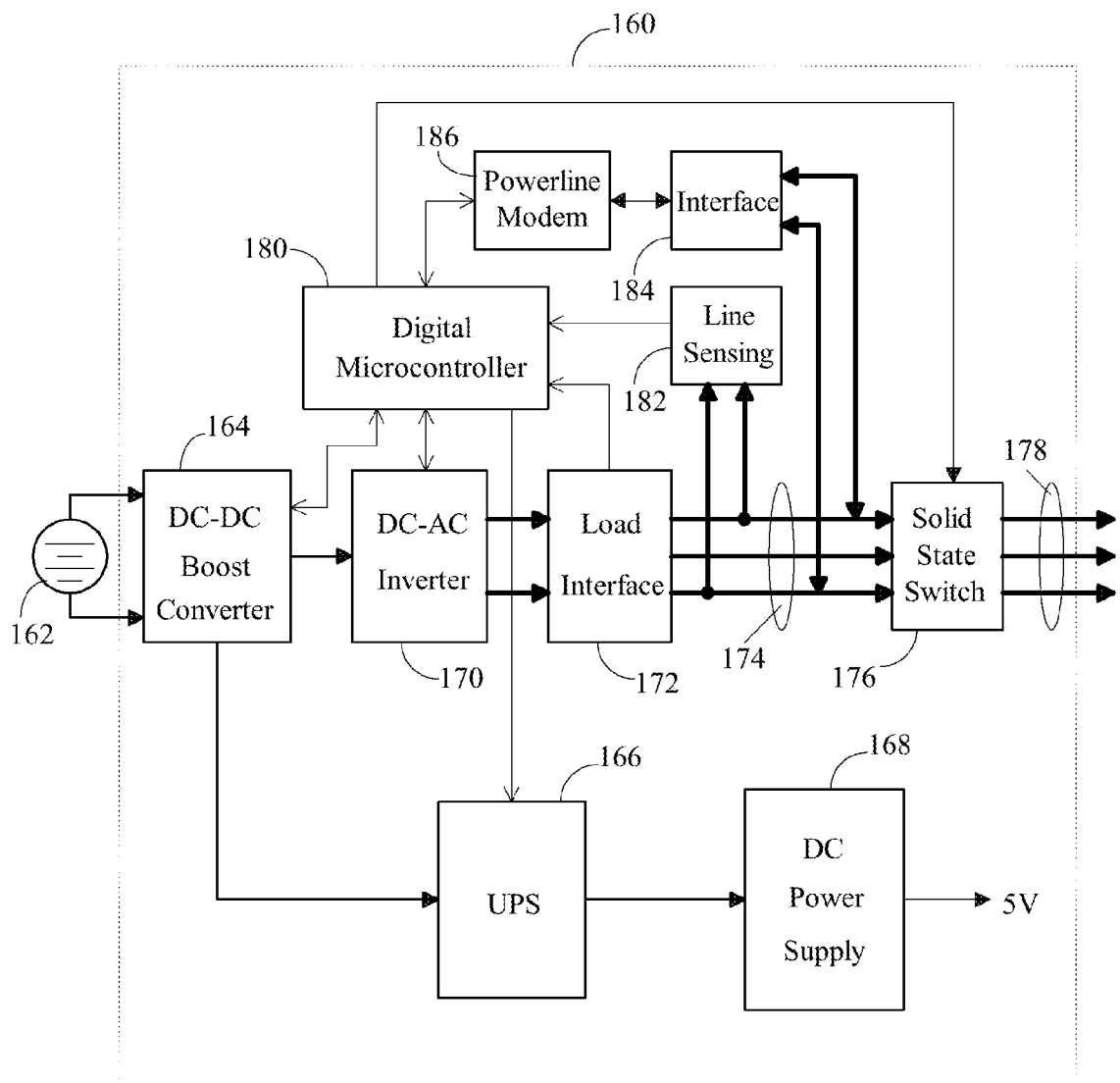
FIG. 6 is a block diagram illustrating a single channel solar power inverter that inverts the DC power from a solar module to single-phase or three-phase AC power being sent to the power grid, where the internal electronic circuits of the inverter is powered by an internal UPS according to an embodiment of this invention.

FIG. 6 is a block diagram illustrating a single channel solar power inverter that inverts the DC power from a solar module to single-phase or three-phase AC power being sent to the power grid, where the internal electronic circuits of the inverter is powered by an internal UPS according to an embodiment of this invention.

The single channel solar power inverter 160 is connected to a solar panel 162 as the DC source. The inverter comprises a DC-DC boost converter 164, a UPS 166, a DC power supply 168, a DC-AC inverter 170, a load interface circuit 172, an internal AC powerline 174, a solid-state switch circuit 176, an external AC powerline 178 that connects to the grid, a digital microcontroller 180, a line sensing circuit 182, an interface circuit for powerline communications 184, and a powerline communications Modem 186.

During normal operating conditions where there is sufficient sunlight, the power from solar panel 162 is delivered to the corresponding DC-DC boost converter 164. The DC power is then inverted by the DC-AC inverter 170 to AC power with a voltage higher than the incoming AC voltage. The generated AC power goes through the load interface circuit 172 to be combined with the AC power in the internal AC powerline 174. A solid-state switch 176 controlled by the digital microcontroller 180 is used to isolate the internal AC powerline 174 from the external AC powerline 178. A line sensing circuit 182 connected to the internal AC powerline 174 is used to detect the phase and zero-crossing point of the incoming AC power from the power grid. The phase and zero-crossing point signals are sent to the digital microcontroller 180 for AC power synchronization to assure that the inverter provides high quality synchronized power to the grid. A powerline communications Modem 186, which is isolated by an interface circuit 184, is used to establish a 2-way digital signal communication between the digital microcontroller 180 and the outside world through the AC powerline.

During normal operating conditions when there is sufficient sunlight, the inverter can run in the power generation mode and stay at the maximum power point (MPP) under irradiance variations. If there is sufficient irradiance, the inverter can generate full rated AC power to feed the grid. During sunrise, sunset, clouding, partial shading, or other low irradiance conditions, the inverter can detect the low irradiance situation based on the DC input power and enter the low power mode. Going into the low power mode, the digital microcontroller 180 selects UPS 166 to provide stored DC power to the DC power supply 168.

Single channel solar power inverters are gaining market share rapidly as this patent application is being written. They are called microinverters that have unique benefits compared with central or string inverters that have partial shading problems. Microinverters are well suited for building "AC Panels" where each solar panel is attached with a microinverter so that the solar panel output is AC instead of DC power. Based on the design of using a UPS to supply power to the internal electronic circuits during the low power mode, single channel solar power inverters or microinverters can avoid unnecessary shutdowns caused by low irradiance situations. On the other hand, since there is only one input channel, the rotating power pulling technique cannot be implemented in the single channel inverter. For the same reason, the single channel inverter will not work in the lunar power mode.

Figure 7:
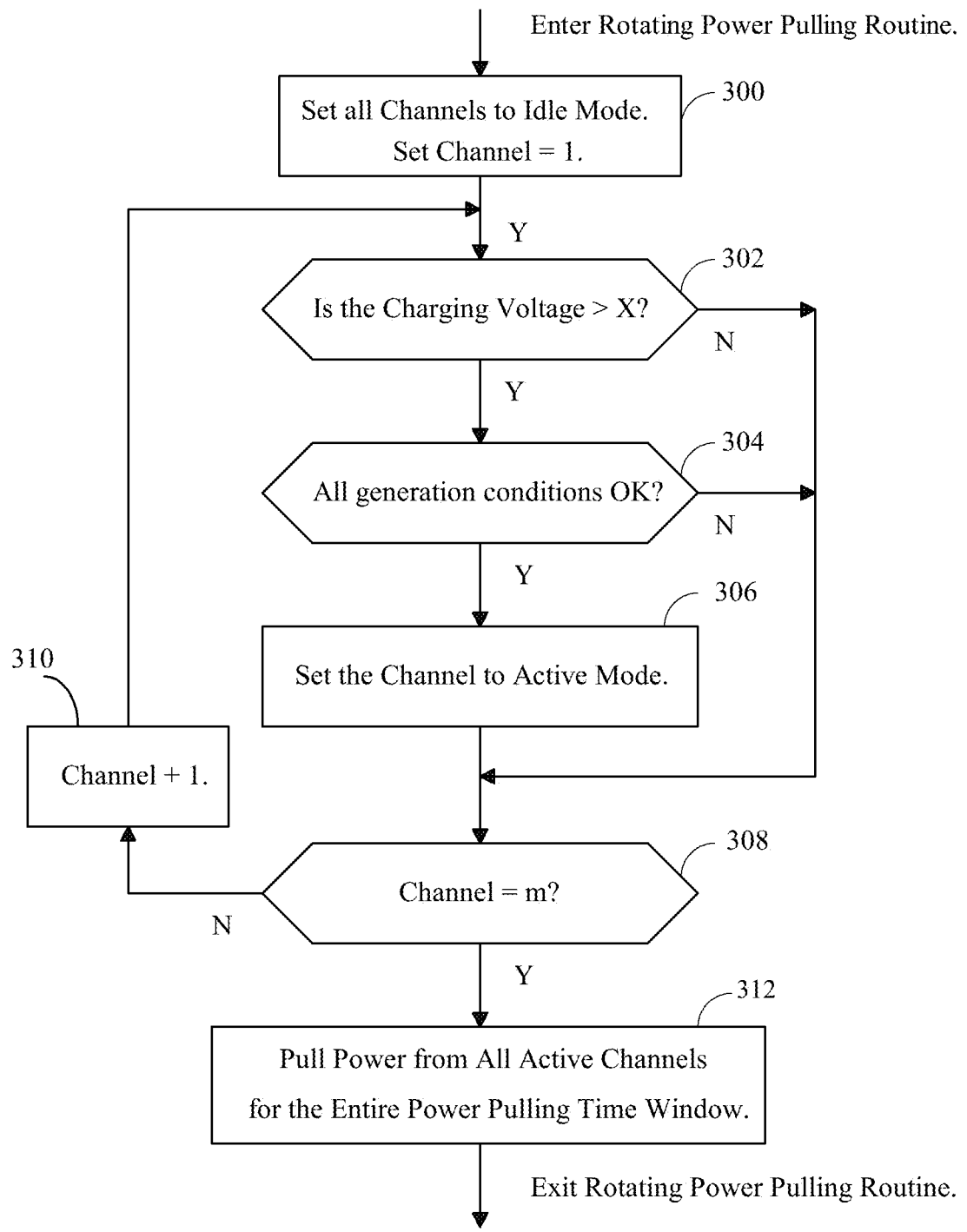
FIG. 7 is a flow chart describing a Rotating Power Pulling Routine running in the digital microcontroller of a solar power inverter according to an embodiment of this invention.

FIG. 7 is a flow chart describing a Rotating Power Pulling Routine running in the digital microcontroller of a solar power inverter according to an embodiment of this invention.

As described in FIG. 3, for a multi-channel solar power inverter to work in the lunar power mode, the inverter will perform the following tasks: (i) at the beginning of each sinewave half cycle, check the energy availability of each channel based on the charging voltage of storage capacitors in its corresponding DC-DC boost converter, (ii) pull power only from those channels that are sufficiently charged, and (iii) if the application demands more uniform AC power output, pull power conservatively so that the channels can have more time to charge the storage capacitors when the irradiance is limited or unstable.

Software for rotating power pulling can be implemented in various ways. Without losing generality, we present a simple design as illustrated in the flow chart of FIG. 7 for demonstration purposes. The following discussion assumes that the inverter is working in the lunar power mode.

An m-channel solar power inverter has m input channels. The inverter has a main program running in the digital microcontroller. It is a high-speed real-time program that checks the AC waveform from the grid. As shown in FIG. 3, each sinewave has an upper and lower half cycle making a full sinewave. A 60 Hz AC signal means that there are 60 full sinewaves every second. If we pull power from a channel for every half cycle of the sinewave, it means that we check the status of each channel 120 times per second.

So, to generate AC power at 60 Hz, the time window for implementing the rotating power pulling technique is 1/120=8.33 milliseconds. We call this a power pulling time window. During each 8.33 millisecond power pulling time window, the inverter pulls power at a predetermined PWM (pulse-width modulation) frequency. Every time the program reaches the beginning of a new 8.33 millisecond time window, it enters the rotating power pulling routine to be described by the flow chart in FIG. 7.

At Block 300, initialization is taking place. The program (i) sets all channels to Idle Mode, and (ii) sets Channel=1. In the Idle Mode, the channels are left alone allowing the input power from the solar modules to charge the storage capacitors.

At Block 302, the program checks if the charging voltage is higher than X, which is a predetermined value. If the answer is No, it means that the channel does not have sufficient energy stored in the capacitors. The program proceeds to Block 308. If the answer is Yes, it means that the channel has stored sufficient energy. Then, the program proceeds to Block 304.

At Block 304, the program checks if all power generation conditions are met. If the answer is No, the program proceeds to Block 308. If the answer is Yes, the program goes to Block 306, where it sets the channel to Active Mode, and then goes to Block 308.

At Block 308, the program checks if Channel=m. If the answer is No, it goes to Block 310, where the channel number is incremented by 1. The program then enters Block 302 to check the next channel. If the Answer is Yes, it means that all m channels have been checked and then the program goes to Block 312. At Block 312, the program pulls power from all channels that are in Active Mode for the entire power pulling time window. For 50 Hz AC, it is 10 milliseconds. For 60 Hz AC, it is 8.33 milliseconds. Then, the program exits. Right after that, it is time for the next power pulling time window. The program enters Block 300 to perform the tasks again. This time, the active channels can be different. In case there are no channels ready for power pulling, the inverter is designed to stay connected and synchronized with the grid AC signal and will skip power generation for a power pulling time window. Of course, the inverter can also be designed to shutdown when there is really not much DC power from the solar modules.

To summarize, the multi-channel solar power inverters described in FIGS. 2, 4, and 5 can work in three power modes: (i) Normal Power, (ii) Low Power, and (iii) Lunar Power. depending on the measured DC input power such as listed in Table 1. The inverter can detect the irradiance situation based on the DC input power and enter a power mode. Solar modules provide power to the DC power supply in the normal power mode. The UPS provides power to the DC power supply in the low power and lunar power mode. The inverter can pull power from each input channel to generate AC power in the normal power and low power mode. In the lunar power mode, the inverter checks all channels and pulls power only from the channels that have sufficient power based on a rotating power pulling mechanism. This design allows the inverter to dynamically adapt to irradiance variations and generate AC power under complex irradiance conditions.

TABLE 1

| Mode | Irradiance | DC Power Supply | AC Power Generation |
| --- | --- | --- | --- |
| Normal Power | Sufficient | Solar Modules | Per Channel Power Pulling |
| Low Power | Low | UPS | Per Channel Power Pulling |
| Lunar Power | Low and Unstable | UPS | Rotating Power Pulling |

The disclosed inventive ideas and methods can be implemented by the hardware and software available today. The applying organization of this patent has built a commercial grid-interactive 4-channel solar power inverter that connects to four 250 W solar modules and can generate 960 W AC power. However, this invention expands the idea of multi-channel solar power inverters in the following ways:

1. A multi-channel solar power inverter can be designed to include a large number of input channels such as 100 or more, if the DC-DC boost converters can be designed and packaged in integrated circuits (ICs) or an IC chip set. This will make the implementation of such an inverter cost-effective.

2. The multiple input channel design along with the rotating power pulling method makes the multi-channel solar power inverter very useful since it truly resolves the partial shading and unstable irradiance problems that limit the harvest of solar energy.

3. As the title of this patent application suggests, if we can generate AC power under the moon light by using photovoltaic solar modules, we should be able to efficiently and cost-effectively harvest much of the green energy that is ignored or wasted on earth.

The invention claimed is:

1. A multiple channel DC-to-AC power inverter, comprising:
a) at least two DC power input ports;
b) an AC power output port arranged to supply AC power to the electric grid;
c) for each DC power input port, a DC-DC boost converter arranged to convert the voltage of a solar module to a higher DC voltage suitable for inversion;
d) a DC power combiner connected to the DC-DC boost converters for combining the DC output from all DC-DC boost converters and allowing the DC-DC boost converters to connect in parallel so that all DC currents are added together;
e) a DC-AC inverter connected to said DC power combiner and arranged to invert the DC power to AC power;
f) an internal AC powerline that allows the generated AC power to be sent to the grid through an external AC powerline;
g) a load interface circuit connected to the DC-AC inverter and to the internal AC powerline, said load interface circuit being arranged to filter high-frequency components out of the DC-AC inverter's AC output;
h) a UPS (uninterruptible power supply) connected to the DC power combiner and a DC power supply connected to the UPS, arranged to work together and supply DC power to internal electronic circuits of the power inverter either by the DC power supply with input power from one or more solar modules or by the UPS;
i) a digital microcontroller connected to the DC-DC boost converters, DC-AC inverter, load interface circuit, and UPS, said microcontroller arranged to perform one or more of measuring input voltage and current, calculating DC input power for each channel, monitoring the DC boost voltage, controlling the DC-DC boost converters, performing maximum power point tracking (MPPT) for each solar module, performing DC-AC inversion, AC power synchronization, and AC output current control, monitoring AC current and voltage for generated power amount and status, performing powerline communications, performing logic controls such as AC powerline switching and isolation, running the power inverter in a normal mode, a low power mode, or a lunar power mode based on calculated DC input power, and selecting the DC power supply or UPS based on the three specified power modes;
j) a powerline modem connected to the digital microcontroller and the internal AC powerline through an interface circuitry for transmitting and receiving performance data between the digital microcontroller and the power grid;
k) a line sensing circuit connected to the internal AC powerline and the microcontroller for detecting the phase and zero-crossing point of the incoming AC power from the power grid; and
l) a solid state switch connected to said internal AC powerline and external AC powerline, and arranged to disconnect said internal AC powerline from the AC grid during a non-generation time.

2. The inverter of claim 1, in which the output of said multiple channel DC-to-AC power inverter is single-phase AC or three-phase AC.

3. The inverter of claim 1, in which said digital microcontroller includes Model-Free Adaptive (MFA) controllers which control the DC-DC boost converter, and MFA optimizers which provide maximum power point tracking (MPPT) to allow the multiple channel DC-to-AC power inverter to achieve optimal power production.

4. A single channel DC-to-AC power inverter, comprising:
a) a DC power input port;
b) an AC power output port arranged to supply AC power to the electric grid;
c) a DC-DC boost converter arranged to convert the voltage of a solar module to a higher DC voltage suitable for inversion;
d) a DC-AC inverter connected to the DC-DC boost converter and arranged to invert the DC power to AC power;
e) an internal AC powerline that allows the generated AC power to be sent to the grid through an external AC powerline;
f) a load interface circuit connected to the DC-AC inverter and to the internal AC powerline, said load interface circuit being arranged to filter high-frequency components out of the said DC-AC inverter's AC output;
g) a UPS (uninterruptible power supply) connected to the DC-DC boost converter and a DC power supply connected to the UPS, arranged to work together and supply DC power to internal electronic circuits of the power inverter either by the DC power supply with input power from the solar module or by the UPS;
h) a digital microcontroller connected to the DC-DC boost converters, DC-AC inverter, load interface circuit, and UPS, said microcontroller arranged to perform one or more of measuring input voltage and current, calculating DC input power for each channel, monitoring the DC boost voltage, controlling the DC-DC boost converters, performing maximum power point tracking (MPPT) for each solar module, performing DC-AC inversion, AC power synchronization, and AC output current control, monitoring AC current and voltage for generated power amount and status, performing powerline communications, performing logic controls such as AC powerline switching and isolation, running the power inverter in a normal mode or a low power mode based on calculated DC input power, and selecting the DC power supply or UPS based on the normal power mode or low power mode;
i) a powerline modem connected to the digital microcontroller and the internal AC powerline through an interface circuitry for transmitting and receiving performance data between the digital microcontroller and the power grid;

j) a line sensing circuit connected to the internal AC powerline and the microcontroller for detecting the phase and zero-crossing point of the incoming AC power from the power grid; and k) a solid state switch connected to said internal AC powerline and external AC powerline, and arranged to disconnect said internal AC powerline from the AC grid during a non-generation time.

5. The inverter of claim 4, in which the output of said single channel DC-to-AC power inverter is single-phase AC or three-phase AC.

6. A method of providing DC power to internal electronic circuits of a solar power inverter, comprising:
 a) entering and exiting a normal power mode and a low power mode based on measured DC input power;
 b) in the normal power mode, supplying DC power through a DC power supply with input power from one or more solar modules;
 c) in the low power mode, supplying DC power through a UPS; and
 d) charging the rechargeable batteries of the UPS during the normal power mode.

7. The method of claim 6, in which the output of the inverter is single-phase AC or three-phase AC.

8. The method of claim 6, in which the inverter sends AC power to the electric grid or supplies power to an AC load.

9. The method of claim 6, in which the inverter comprises:
 a) at least two DC power input ports;
 b) an AC power output port arranged to supply AC power to the electric grid;
 c) for each DC power input port, a DC-DC boost converter arranged to convert the voltage of a solar module to a higher DC voltage suitable for inversion;
 d) a DC power combiner connected to the DC-DC boost converters for combining the DC output from all DC-DC boost converters and allowing the DC-DC boost converters to connect in parallel so that all DC currents are added together;
 e) a DC-AC inverter connected to said DC power combiner and arranged to invert the DC power to AC power;
 f) an internal AC powerline that allows the generated AC power to be sent to the grid through an external AC powerline;
 g) a load interface circuit connected to the DC-AC inverter and to the internal AC powerline, said load interface circuit being arranged to filter high-frequency components out of the DC-AC inverter's AC output;
 h) a UPS (uninterruptible power supply) connected to the DC power combiner and a DC power supply connected to the UPS, arranged to work together and supply DC power to internal electronic circuits of the power inverter either by the DC power supply with input power from one or more solar modules or by the UPS;
 i) a digital microcontroller connected to the DC-DC boost converters, DC-AC inverter, load interface circuit, and UPS, said microcontroller arranged to perform one or more of measuring input voltage and current, calculating DC input power for each channel, monitoring the DC boost voltage, controlling the DC-DC boost converters, performing maximum power point tracking (MPPT) for each solar module, performing DC-AC inversion, AC power synchronization, and AC output current control, monitoring AC current and voltage for generated power amount and status, performing powerline communications, performing logic controls such as AC powerline switching and isolation, running the power inverter in a normal mode, a low power mode, or a lunar power mode based on calculated DC input power, and selecting the DC power supply or UPS based on the three specified power modes;
 j) a powerline modem connected to the digital microcontroller and the internal AC powerline through an interface circuitry for transmitting and receiving performance data between the digital microcontroller and the power grid;
 k) a line sensing circuit connected to the internal AC powerline and the microcontroller for detecting the phase and zero-crossing point of the incoming AC power from the power grid; and
 l) a solid state switch connected to said internal AC powerline and external AC powerline, and arranged to disconnect said internal AC powerline from the AC grid during a non-generation time.

10. An m-channel solar power inverter, comprising:
 a) at least two DC input channels, each of which comprises a DC-DC boost converter, measurement circuits, supporting circuits, and cables and connectors to connect to a solar module;
 b) an AC power output port arranged to supply AC power to the electric grid or an AC load through an external AC powerline;
 c) a DC power combiner connected to said DC-DC boost converters for combining the DC output from all DC-DC boost converters;
 d) a UPS (uninterruptible power supply) connected to the DC power combiner and a DC power supply connected to the UPS, arranged to work together and supply DC power to internal electronic circuits of the power inverter either by the DC power supply with input power from one or more solar modules or by the UPS; and
 e) a digital microcontroller connected to the DC-DC boost converters and the UPS, said digital microcontroller being arranged to measure input voltage and current to calculate DC input power for each input channel, and being constructed to run the inverter in a normal mode, or a low power mode, or a lunar power mode based on calculated DC input power.

11. The inverter of claim 10, in which the output of the inverter is single-phase AC or three-phase AC.

12. The inverter of claim 10, in which the UPS is designed to include rechargeable batteries to be charged by the DC power from the solar modules.

13. The inverter of claim 10, in which said digital microcontroller is programmed to execute a rotating power pulling routine at the beginning of each predefined power pulling time window.

14. A multiple channel off-grid AC Master DC-to-AC power inverter, comprising:
 a) at least two DC power input ports;
 b) an AC power output port arranged to supply AC power to an AC load;
 c) for each DC power input port, a DC-DC boost converter arranged to convert the voltage of a solar module to a higher DC voltage suitable for inversion;
 d) a DC power combiner connected to the DC-DC boost converters for combining the DC output from all DC-DC boost converters and allowing the DC-DC boost converters to connect in parallel so that all DC currents are added together;
 e) a DC-AC inverter connected to said DC power combiner and arranged to invert the DC power to AC power;
 f) an internal AC powerline that allows the generated AC power to be sent to the AC load through an external AC powerline;

g) a load interface circuit connected to the DC-AC inverter and to the internal AC powerline, said load interface circuit being arranged to filter high-frequency components out of the DC-AC inverter's AC output;

h) a load detector connected to said internal AC powerline and external AC powerline, and arranged to detect the impedance of the connected AC load;

i) a UPS (uninterruptible power supply) connected to the DC power combiner and a DC power supply connected to the UPS, arranged to work together and supply DC power to internal electronic circuits of the power inverter either by the DC power supply with input power from one or more solar modules or by the UPS;

j) a digital microcontroller connected to said DC-DC boost converter, DC-AC inverter, load interface circuit, load detector, and UPS, said microcontroller arranged to perform one or more of monitoring the DC boost voltage and calculating DC input power for each channel, controlling the DC-DC boost converter, performing maximum power point tracking (MPPT), performing DC-AC inversion, monitoring AC current and voltage for generated power amount and status, performing powerline communications, checking the impedance of the AC load to determine if it is within predetermined specifications, initially energizing the internal and external AC powerline, continually delivering AC power to the internal and external AC powerline to allow the other power inverters also connected on the same external powerline to synchronize the AC power being produced, continually checking and determining whether the AC load is too large or too small for the power generation system to handle, turning the power off and triggering an error signal if the load is too large or too small, and running the power inverter in normal or low power mode based on calculated DC input power, running the power inverter in a normal mode, a low power mode, or a lunar power mode based on calculated DC input power, and selecting the DC power supply or UPS based on the three specified power modes;

k) a powerline modem connected to the digital microcontroller and the internal AC powerline through an interface circuitry for transmitting and receiving performance data between the digital microcontroller and the power grid; and l) a line sensing circuit connected to the internal AC powerline and the microcontroller for detecting the phase and zero-crossing point of the incoming AC power from the power grid.

15. The inverter of claim 14, in which the output of the inverter is single-phase AC or three-phase AC.

16. A method of pulling power from input channels of a multi-channel solar power inverter in rotation, comprising:
   a) checking energy availability for each input channel;
   b) defining a power pulling time window based on AC signal frequency; and
   c) pulling power only from the channels that have sufficient stored energy during the power pulling time window.

17. The method of claim 16, in which the power pulling time window is defined based on the half cycle or the full cycle of an AC sinewave of the electric gird power.

18. The method of claim 16, in which the power pulling time window is substantially 10 or 20 milliseconds for generating 50 Hz AC power and 8.33 or 16.66 milliseconds for generating 60 Hz AC power.

19. The method of claim 16, in which each of the solar power inverters comprises:
   a) at least two DC input channels, each of which comprises a DC-DC boost converter, measurement circuits, supporting circuits, and cables and connectors to connect to a solar module;
   b) an AC power output port arranged to supply AC power to the electric grid or an AC load through an external AC powerline;
   c) a DC power combiner connected to said DC-DC boost converters for combining the DC output from all DC-DC boost converters;
   d) a UPS (uninterruptible power supply) connected to the DC power combiner and a DC power supply connected to the UPS, arranged to work together and supply DC power to internal electronic circuits of the power inverter either by the DC power supply with input power from one or more solar modules or by the UPS; and
   e) a digital microcontroller connected to the DC-DC boost converters and the UPS, said digital microcontroller being arranged to measure input voltage and current to calculate DC input power for each input channel, and being constructed to run the inverter in a normal mode, or a low power mode, or a lunar power mode based on calculated DC input power.

* * * * *